United States Patent
Duran

(10) Patent No.: US 6,941,547 B2
(45) Date of Patent: Sep. 6, 2005

(54) APPARATUS AND METHOD FOR PORTING APPLICATIONS TO DIFFERENT PLATFORMS

(75) Inventor: Aldo Alejandro Duran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 09/888,451

(22) Filed: Jun. 25, 2001

(65) Prior Publication Data

US 2003/0009747 A1 Jan. 9, 2003

(51) Int. Cl.$^7$ ............................................. G06F 9/45
(52) U.S. Cl. ......................................................... 717/136
(58) Field of Search ........................ 717/128, 136–138, 717/146; 713/2

(56) References Cited

U.S. PATENT DOCUMENTS 5,713,009 A * 1/1998 DeRosa et al. ................. 713/2
2002/0138821 A1 * 9/2002 Furman et al. ............. 717/128

OTHER PUBLICATIONS

Martin Taylor, "Port Your UNIX Apps to OS/400", Datamation, Apr. 15, 1996.*
Wind/U—The Leading Windows API & MFC Cross–Platform Solution, Bristol Technology, 1999.*
Bob DuCharme, The Operating Systems Handbook, Jun. 15, 2001, McGraw–Hill, Part 1 and Part 4.*

* cited by examiner

Primary Examiner—Anil Khatri
Assistant Examiner—Trent J Roche
(74) Attorney, Agent, or Firm—Duke W. Yee; Jeffrey S. LaBaw; Gerald H. Glanzman

(57) ABSTRACT

Apparatus and method for porting applications to different platforms. The apparatus and method use a mapping table function that receives source filenames and directory structures and maps them to filenames and directory structures appropriate for a target platform. In a preferred embodiment, the apparatus and method map flexible filenames and directory structures, such as is found with the Unix filesystem, to more restrictive filenames and directory structures, such as is found with the OS/400 filesystem. In this way, an application developer may make use of the more flexible filesystem of conventions such as Unix, when developing application files and use the apparatus and method to automatically handle converting these more flexible filenames and directory structures to the more restrictive filenames and directory structures of platforms to which the application is to be ported.

39 Claims, 3 Drawing Sheets

APPARATUS AND METHOD FOR PORTING APPLICATIONS TO DIFFERENT PLATFORMS

BACKGROUND OF THE INVENTION

1. Technical Field

The present invention is directed to an improved data processing system. More specifically, the present invention is directed to an apparatus and method for porting applications to different platforms.

2. Description of Related Art

To port applications from one operating system platform to another operating system platform may be very difficult because the target platform may not make use of the same or similar filesystem as the original platform on which the application was developed. For example, a Unix operating system filesystem is hierarchical and thus, allows for directories within directories. Moreover, the filenames in any of the directories can be up to 254 characters in length. An example of filenames in this type of filesystem may be:

/dirName1/dirName2/then_a_file_name_which_can_be_long_like_this; and
/dirName1/dirName2/dirName3/then_a_file_name_which_can_be_long_like_this Note that the name of the file can be the same when it is in two different directories and yet represent two different files.

In addition, the Unix filesystem is case sensitive. This means that a filename with lower case letters is different than a filename that uses the same characters in uppercase or mixed case.

Other operating systems, such as MS-DOS and Netware, may have limitations on the length of filenames. For example, MS-DOS and Netware each limit the length of the filenames to eight characters with three characters for the extension. Examples of MS-DOS and Netware filenames are:

/dirName1/dirName2/filename.ext
/dirName1/dirName2/dirName3/filename.ext

Other operating systems, such as iSeries hosts running OS/400, have the limitation in which the native filesystem cannot have directories within directories, i.e. there is no hierarchical filesystem, and the filenames of directories or files cannot be longer than 10 characters. Thus, in an OS/400 operating system, the filenames are of the type:

DIRNAME1/FILENAME
DIRNAME2/FILENAME

Moreover, this filesystem is not case sensitive. Thus, a filename that uses lowercase characters is the same as a filename that uses the same characters in upper case or mixed case.

Because of this difference in the capabilities of the filesystems of the various platforms, there are two basic ways that an application designed to be used with a plurality of platforms may be made compatible with a plurality of platforms. First, the set of files for the application may be the same for all platforms. This would require that the files conform to the most restricted filesystem requirements, i.e. filenames with no more than ten characters and no hierarchical directory structures.

Second, there may be several different sets of files, one for each platform. In this way, one operating system filesystem would not be limited to the filesystem naming requirements of the most restrictive filesystem and the inability to use hierarchical directory structures. The tradeoff, however, is that several sets of source files must be maintained, thereby increasing the complexity of supporting multiple platforms.

Neither of the two above options provides an optimum solution to making applications compatible with a plurality of platforms. In the first case, the application must be designed within the limitations of the most restrictive filesystem. In the second case, the complexity and overhead of maintaining multiple sets of source files makes this solution undesirable. Therefore, it would be beneficial to have an apparatus and method for porting applications to multiple platforms that avoids the drawbacks of the prior art noted above.

SUMMARY OF THE INVENTION

The present invention provides an apparatus and method for porting applications to different platforms. The apparatus and method make use of a mapping table function that receives source filenames and directory structures and maps them to filenames and directory structures appropriate for a target platform. In a preferred embodiment, the apparatus and method map flexible filenames and directory structures, such as is found with the Unix filesystem, to more restrictive filenames and directory structures, such as is found with the OS/400 filesystem. In this way, an application developer can develop application files without being limited to the most restrictive filesystem conventions. That is, a developer may make use of the more flexible filesystem conventions of Unix, for example, when developing application files and use the apparatus and method of the present invention to automatically handle converting these more flexible filenames and directory structures to the more restrictive filenames and directory structures of platforms to which the application is to be ported.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides an apparatus and method of porting applications to a plurality of platforms. Such porting may be performed in a stand alone computer system or may be distributed across a number of different computing devices in a distributed data processing system. As such, a brief explanation of the distributed data processing system, server devices and client devices is provided to aid in understanding the environments in which the present invention may be implemented.

Figure 1:
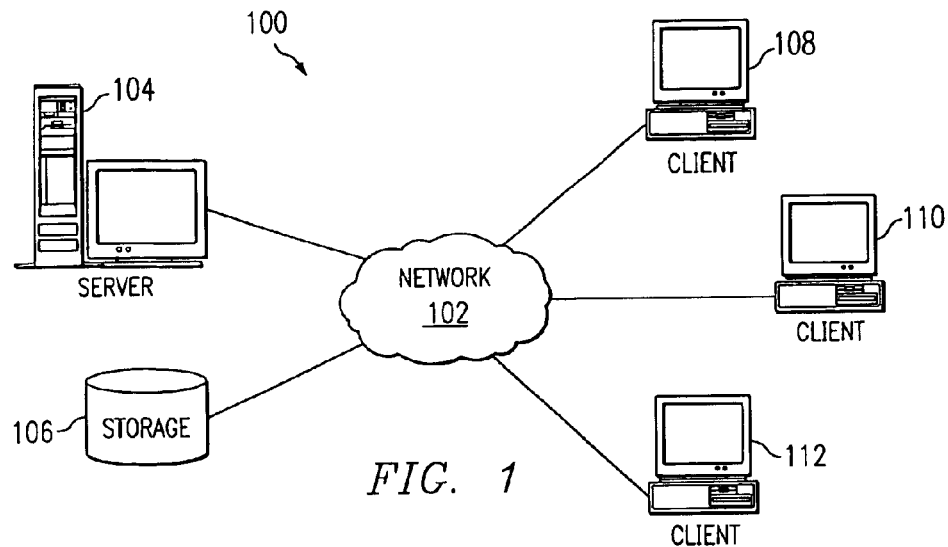
FIG. 1 is an exemplary diagram of a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
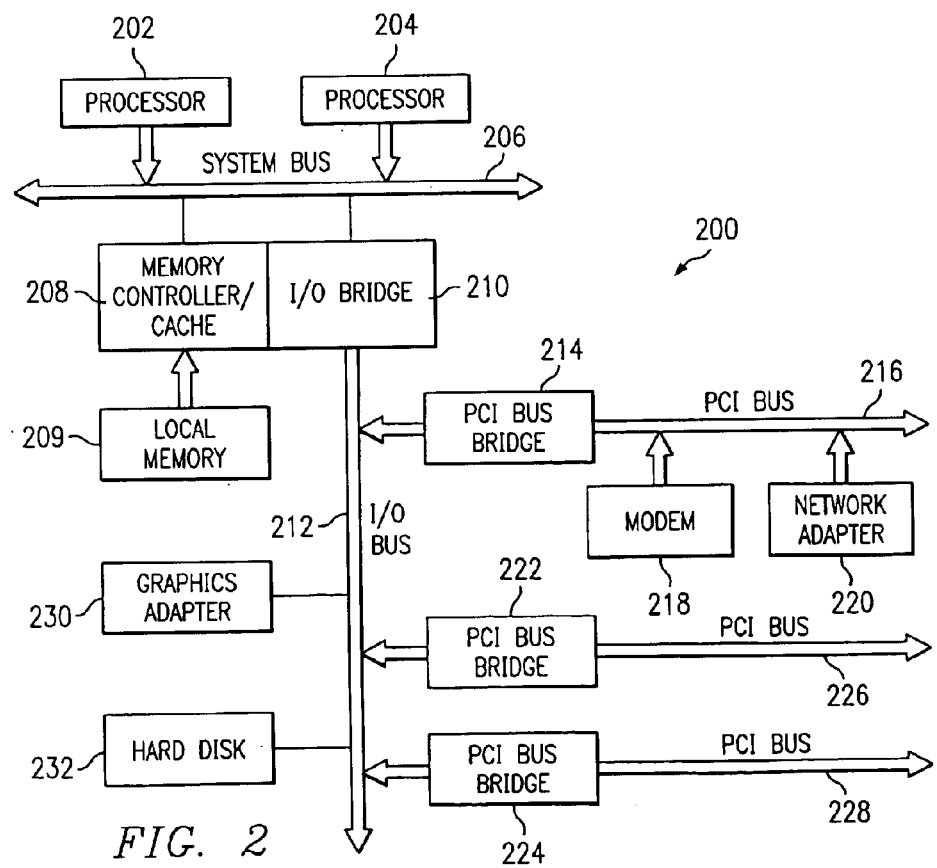
FIG. 2 is an exemplary diagram of a server device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
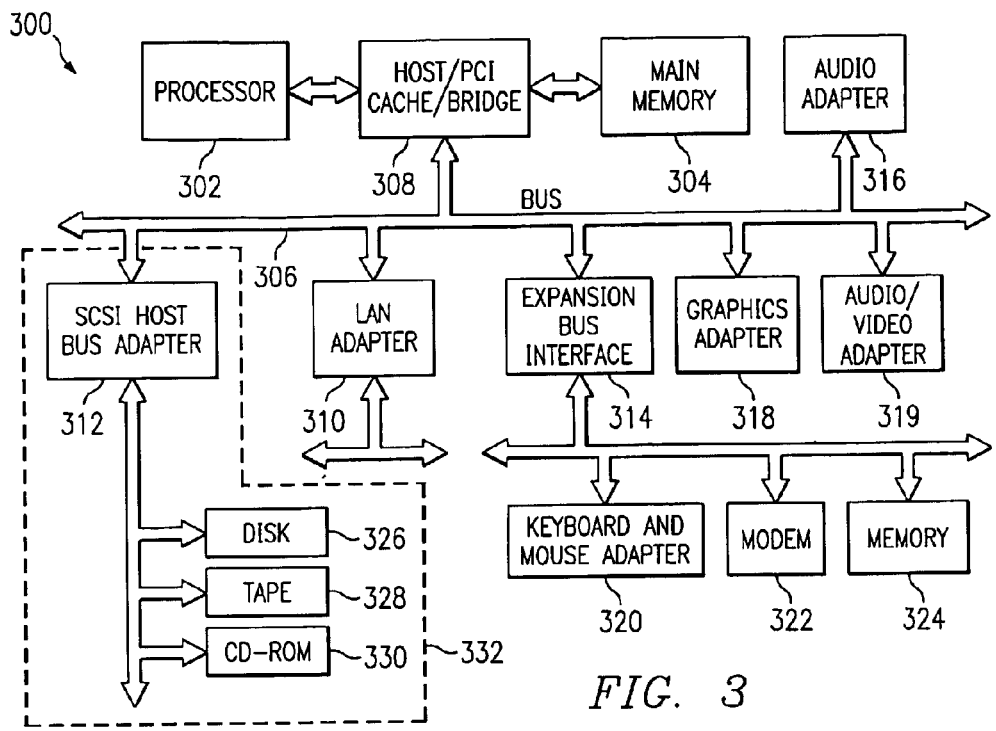
FIG. 3 is an exemplary diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides an apparatus and method for porting applications to multiple platforms. When developing applications to be used on multiple platforms, it would be most efficient to be able to use the same tools and the same source code with the same filenames on each of the platforms. This would help application developers to reduce maintenance and complexity of multi-platform development while allowing the developers to create applications without having to adhere to the most restrictive platform requirements.

One way in which to provide such ability is to have a mapping table function that can be used to map filenames and directory structures of application source code to conform with the various platforms on which the applications are to be implemented. The present invention provides such a mapping table function and an apparatus and method for using this mapping table function to facilitate porting of applications to various platforms.

Figure 4:
FIG. 4 is an exemplary diagram illustrating the use of a mapping table function according to the present invention.

FIG. 4 illustrates the use of the mapping table function according to the present invention. As shown in FIG. 4, a program having flexible filenames and/or directory structures is input to the mapping table function 410. The filenames and/or directory structures are flexible in that they may be unrestricted in size and directory hierarchy or may be very limited in size and hierarchy, depending on the preference of the developer that develops the application. While the present invention may be used to map restrictive filesystem based applications to less restrictive filesystem platforms, the most benefit of the present invention is obtained when applications are written in the least restrictive filesystem platforms and the mapping table function 410 is used to conform these applications to more restrictive filesystem platforms.

The mapping table function 410 operates on the filenames and directory structure input to the mapping table function 410, and outputs native filenames. These native filenames and directory structures are native to the filesystem platform to which the application is being ported. The native filenames and directory structures may then be used with a compiler 420 for the target platform, i.e. the platform to which the application is to be ported, to thereby generate an executable program 430. Thus, for example, a relatively flexible filesystem based operating system, such as Unix, may be used to create applications that may be ported to a relatively restricted filesystem based operating system, such as OS/400.

The compiler 420, of the present invention may be a native compiler or a cross compiler. When a developer of applications writes code, the developer uses a compiler to generate a module. With several modules, the developer can create an executable file. The process of compiling the code can be native in the target system or can be done using a cross compiler.

Figure 5:
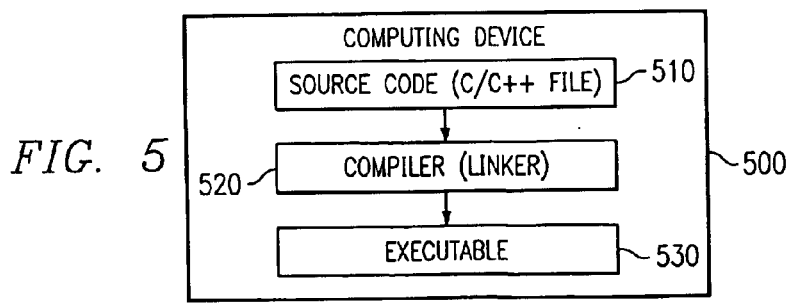
FIG. 5 is an exemplary diagram illustrating a native compilation according to the present invention.

FIG. 5 illustrates an example of native compilation of computer code. As shown in FIG. 5, a developer creates source code 510, such as C/C++ source code, using computing device 500. The computing device 500 is equipped with a compiler (and linker) 520 that compiles and links the source code to thereby generate the executable 530 that may be used with the operating system of computing device 500.

Figure 6:
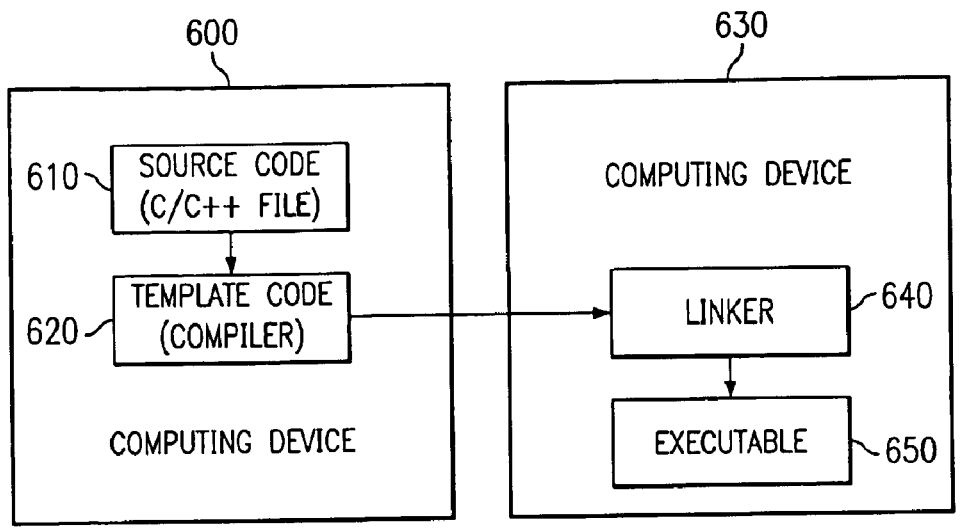
FIG. 6 is an exemplary diagram illustrating a cross compilation according to the present invention.

FIG. 6 illustrates an example of cross compilation of computer code. As shown in FIG. 6, a developer creates source code 610, such as C/C++ source code, using computing device 600. The source code 610 is compiled to template code 620 (also sometimes referred to as wcode) which may then be provided to a linker 640 in a second computing device 630 having a different operating system platform than computing device 600. The linker 640 then links the template code 620 to thereby generate executable 650 in computing device 630. Template code is code that has not yet been converted to machine binary. It is an intermediate code that needs to be translated or further compiled in the target machine to get the machine instructions.

Whether using native compilation or cross compilation, the developer of an application using the present invention may use flexible filenames and directory structures, such as Unix type filenames and directory structures, to create the application. The present invention is then able to take these flexible filenames and directory structures and convert them, via a mapping table function, to proper filenames and directory structures for a target platform. Using a native compiler, the developer may take the file that he/she created, apply the mapping table function of the present invention to generate a filename for the source file that is appropriate for the target platform, and then compile the application natively. Using a cross compiler, the developer may take the file that he/she created, compile the file using the cross compiler, and then generate the new filename appropriate for the target platform using the mapping table function of the present invention.

As an example of the manner by which the mapping table function of the present invention operates to convert flexible filenames and directory structures to more restrictive filenames and directory structures, the following examples will assume that a developer is developing an application in a Unix platform and wishes to port the application to an OS/400 platform. This assumption is only made for illustrative purposes and the present invention is not limited to such. Rather, the use of the mapping table function to port between any two platforms is intended to be within the spirit and scope of the present invention.

The mapping table function of the present invention essentially receives the flexible filename and directory structure of the files of an application being developed and converts them to a more restrictive filename and directory structure of the target platform. For example, a long filename and hierarchical directory structure may be converted to a 10 character filename with a single level directory structure.

This may be performed by taking, for example, the first 10 characters from the flexible filename and check to see if this name has already been generated. The check of these first 10 characters may be made against a file or cache table of previously generated names that is maintained by the mapping tool function of the present invention.

If the filename was already generated during the mapping process, a notification may be provided to the developer so that the developer may select a new filename consistent with the target platform. Alternatively the mapping table function of the present invention may automatically assign the filename a new designation and recheck the new designation. This new designation may be generated, for example, by replacing the last of the selected 10 characters with a number or alternate character. If the new designations are already present in the cache table or name file, the mapping table function may then generate new designations by replacing the last two of the 10 characters using various combinations, and so on, until a valid new filename is generated.

The hierarchical directory structure may be "flattened" to a restricted directory structure, such as a single level directory structure, in any of a number of different ways. For example, the present invention may receive identifiers of the directory in which temporary files will be created and the directory of the final product and thus, place all of the files having the new file names described above, into the final product directory. Alternatively, the present invention may get the directory from the name of the first directory in the chain of directories in the source code. Other similar mechanisms for flattening the directory structure may be used without departing from the spirit and scope of the present invention.

In many programs, the programs are created in such a way that they can easily support multiple platforms with the use of the present invention. For example, many programs are created and are linked to libraries so that the changing of the filenames and directory structures does not affect the functioning of the program itself. For example, in Unix a program PGm/d1/execs/A may link to /d1/d2/libx, /d1/d2/liby and /d1/d2/libc where the names could be long in the hierarchical directory. However, when these file names are converted for use with an OS/400 platform, the same program will be program A that links to libraries libx, liby and libz. The user may execute program A and there is no need to know about the change to the filenames and directory structure because they are linked at build time. At build time, the mapping table will take care of the name translation.

In other cases, the source code may need to be changed in view of the changes to the filenames and the directory structures using the present invention. For example, if program A is created such that it calls program B to do some task, program A needs to know the location and name of program B. In this case, programers are to make use of standards for creating their programs such that all the filenames of other programs that the program needs to call are defined in such a way that they may be easily changed using the present invention. Such a standard may be to use a header file that defines the programs called by a particular program.

With such a standard, the present invention may make use of an automated process for editing such header files and changing the filenames therein accordingly. For example, after having processed the filenames as described above, the present invention may then edit header files associated with the files that have been processed to change the filenames therein using the mapping function of the present invention.

For example, in a program PgmA.c there may be a statement:
    #include <ThisAppOtherProgramNames.h>
Thus, when the program PgmA.c needs to call another program, PgmB, it may use a macro such as:
    Sapwn(PGMB_NAME, other parameters, . . . );
The macro is defined, for example, in the file ThisAppOtherProgramNames.template as follows:
    #define PGMB_NAME "somedir/execs/ProgramB"
At build time, the template ThisAppOtherProgramNames.template is converted to ThisAppOtherProgramNames.h changing all the strings with long filenames to short filenames as required.

In other cases, there may be a single executable that calls all other functions depending on the parameters passed to it. Thus, only one executable is needed and everything else is in libraries. Accordingly, the filename changes are then handled at build time in a similar manner as described above. Therefore, the source code does not need to be changed to reflect the changes to the filenames and directory structure.

An application is made of one or more executables. If an application is very simple, like an editor, only one executable may be needed. If an application is very complex, then a plurality of executables may be required. An executable may, in turn, be composed of one or more modules, depending on the complexity of the executable.

When software developers create applications, the developers use a compiler, such as a native or cross compiler, and tools such as the "make" tool or "gnu-make" tool to aid the developer in compiling all of the source code, avoid having to enter all required commands manually, and help avoid errors in the build of the application, i.e. a version of the application that is still in a development state.

"Make" is a tool which controls the generation of executables and other non-source files of a program from the program's source files. The "make" tool gets its knowledge of how to build a program from a file called the makefile, which lists each of the non-source files and how to compute it from other files. More information regarding the "make" and "gnu-make" tools may be obtained, for example, from www.gnu.org/software/make/make.html.

The "make" tools also allow developers to have smart partial builds of an application in which only those modules that need to be compiled will be compiled and the application is recreated only with what has changed. The "make" tools use "makefiles" that are files executed by the compiler's "make" tool. The makefile lists the program modules that are part of the project and associated libraries that must be linked. The makefile also includes special directives that enable certain modules to be compiled differently if required.

The following is an example of a makefile that specifies the rules used in a build of an application for the Unix environment:

```
#------------------------------------------
COMPILER = gcc
VPATH = /dir1/dir2/dir3
TGTDIR = /dir1/dir2/prod_name
# rule 1 to indicate how to compile a module
%.o:%.c
    $(COMPILER) –o $@ –c $^
# rule 2 to link and create the executable
program.exe: File_Source_1.o File_Source_2.o
    $(COMPILER) $^ –o $(TGTDIR)/$@
#------------------------------------------
```

With this makefile, the only command required by the developer to execute is "gun-make program.exe". Upon entering this command, the gun-make tool will use rule 2 to build the "program.exe". Rule 2 shows File_Source_1.o and File_Source_2.o are dependencies to build "program.exe". The gnu-make tool cannot build the program.exe until it has the modules of the build. Therefore, the gnu-make tool will look for a way to build the modules and identify rule 1. Rule 1 includes the commands to build the modules File_Source_1.o and File_Source_2.o.

With the present example, the gnu-make tool will compile the modules and invoke the GNU Compiler Collection (gcc) compiler, which is a free compiler collection for C, C++, Fortran, Objective C, and other programming languages, with parameters as specified by rule 1 in the makefile:

gcc -o File_Source_1.o -c /dir1/dir2/dir3/File_Source_1.c
gcc -o File_Source_2.o -c /dir1/dir2/dir3/File_Source_2.c
The gnu-make tool will then link the modules to create an executable using rule 2:
gcc -o /dir1/dir2/prod_name/program.exe File_Source_1.o File_Source_2.o To build the same application for an OS/400 platform with minimum changes in the build environment from that described above, the cross compiler that will handle the build in the same way as the gcc needs to be specified. In order to do this, the value of the COMPILER variable for the gnu-make tool needs to be modified to:
COMPILER=tcc4
When the rule is applied and gnu-make tool executes the commands, the gnu-make tool will call tcc4 instead of gcc. The tcc4 tool, which implements the functions of the present invention, takes the parameters and converts the long filenames to filenames that can be used by the OS/400 platform. As an example, the gnu-make tool invokes the tcc4 tool as specified in rule 1 of the makefile:
tcc4 -o File_Source_1.o -c /dir1/dir2/dir3/File_Source_1.c
tcc4 -o File_Source_2.o -c /dir1/dir2/dir3/File_Source_2.c
Internally, the tcc4 tool calls the cross compiler using, for example:
ilecx -c /dir1/dir2/dir3/File_Source_1.c -o File_Source_1.o
The cross compiler generates template code (wcode) and provides it to the mapping table function of the present invention. The mapping table function of the present invention maps the flexible filenames to restricted filenames appropriate for OS/400. In this example, the mapping table function maps /dir1/dir2/dir3/File_Source_1.o to DIRT/FILE1 (echo quote RCMD "CRTXMOD DIRT/FILE1"; echo quit)|ftp dlos445, where DIRT is the target directory and the FILE1 filename is obtained from the first five characters of the original filename.

After having performed the mapping using the mapping table, the tcc4 tool links the modules to create an executable:
tcc4 -o /dir1/dir2/prod_name/program.exe File_Source_1.o File_Source_2.o
Internally, tcc4 will link the modules in the OS/400 format by mapping the flexible filenames to the more restrictive filenames of the OS/400 filesystem. In this particular example, the filename of the executable will be mapped from /dir1/dir2/prod_name/program.exe to DIRX/PROGR (echo quote RCMD "CRTPGM DIRX/PROGR DIRT/FILE1 DIRT/FILE2"; echo quit)|ftp dlos445

Figure 7:
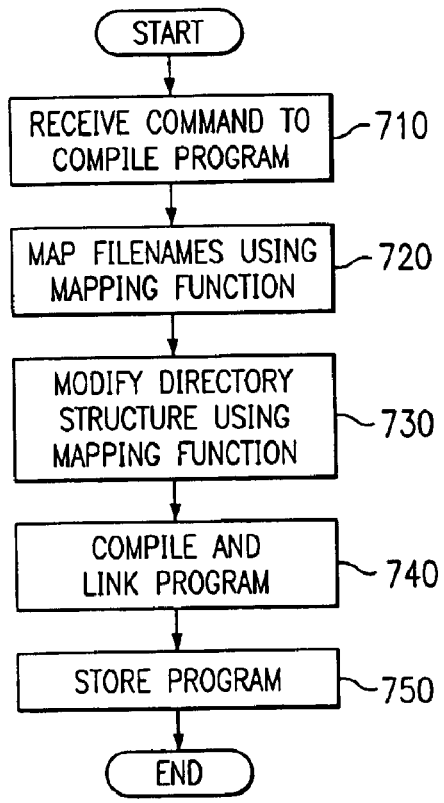
FIG. 7 is a flowchart outlining an exemplary operation of the present invention.

FIG. 7 is a flowchart outlining an exemplary operation of the present invention. As shown in FIG. 7, the operation starts with receiving a command to compile a program or module for use with a different platform (step 710). The filenames used by the program or module are then mapped, using the mapping function of the present invention (step 720). The mapping of the filenames may be from a more flexible filename structure to a more restrictive filename structure or vice versa depending on the filename structure used to generate the original module or program and the filename structure of the target platform.

Thereafter, the directory structure is modified using the mapping function of the present invention (step 730). The modification to the directory structure may include flattening the directory structure from a hierarchical directory structure to a restricted directory structure, such as a single level directory structure. The modification of the directory structure may be based on temporary and/or final product directories defined by the user, based on a first directory in the hierarchy of directories of the original directory structure, or the like.

After having modified the filenames and the directory structure, the program or module is compiled and linked (step 740). If the header files need to be modified to reflect the changes to the filenames and the directory structure, such modifications are made prior to compiling and linking the program or module. Thereafter, the compiled executable is stored for later use (step 750).

Thus, the present invention provides a mechanism by which programs created for use with a first platform may be modified to be used with other platforms having different filesystems and directory structures. The present invention provides an automated process for performing this mapping from one platform convention to another such that a human programmer need not worry himself/herself with making the modifications manually.

While the present invention has been described above in terms of a tool that is implemented in a build environment, the present invention is not limited to such. Rather the mapping functions of the present invention may be implemented in an editor tool that edits files. For example, the editor may internally change the flexible filenames and directory structure, used by the programmer to create the files, to more restricted filenames and directory structures. Thus, the mapping function of the present invention need not be restricted to operating in a build environment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of porting a program from a first platform to a second platform, comprising:
  converting at least one of filenames and a directory structure of the program from a first platform standard for the first platform to a second platform standard for the second platform, wherein the first platform standard includes a first filename structure and a first directory hierarchy structure, wherein the second platform standard includes a second filename structure and a second directory hierarchy structure, and wherein at least one of the second filename structure is more restricted in length than the first filename structure and the second directory hierarchy structure is more restricted in hierarchy than the first directory hierarchy structure; and storing the program for use with the second platform.

2. The method of claim 1, wherein converting at least one of filenames and a directory structure includes shortening filenames in the first filename structure to shortened filenames in the second filename structure.

3. The method of claim 1, wherein the first directory structure is a hierarchical directory structure and the second directory structure is a nonhierarchical directory structure.

4. The method of claim 1, wherein the first platform is a Unix® platform and the second platform is an OS/400® platform.

5. The method of claim 1, wherein converting at least one of filenames and a directory structure of the program is performed in a build environment.

6. The method of claim 1, wherein converting at least one of filenames and a directory structure of the program is performed using a file editor.

7. The method of claim 1, wherein converting at least one of filenames and a directory structure of the program includes modifying header files associated with files in the program to reflect the conversion of at least one of the filenames and the directory structure.

8. The method of claim 1, wherein convening at least one of filenames and a directory structure includes changing an original filename and directory structure to a modified filename and directory structure based on a mapping from the first platform to the second platform.

9. The method of claim 8, further comprising:

determining if the modified filename and directory structure already exists; and further modifying the modified filename and directory structure if the modified filename and directory structure already exists.

10. The method of claim 9, wherein further modifying the modified filename and directory structure includes:

notifying a user of a prior existence of the modified filename and directory structure; and receiving a selection of a new filename and directory structure from the user.

11. The method of claim 9, wherein modifying the modified filename and directory structure includes:

replacing a character of the filename with a number or alternate character.

12. The method of claim 1, further comprising compiling the program natively.

13. The method of claim 1, further comprising compiling the program using a cross-compiler.

14. A computer program product in a computer readable medium for porting a program from a first platform to a second platform, comprising:

first instructions for converting at least one of filenames and a directory structure of the program from a first platform standard for the first platform to a second platform standard for the second platform, wherein the first platform standard includes a first filename structure and a first directory hierarchy structure, wherein the second platform standard includes a second filename structure and a second directory hierarchy structure, and wherein at least one of the second filename structure is more restricted in length than the first filename structure and the second directory hierarchy structure is more restricted in hierarchy than the first directory hierarchy structure; and second instructions for storing the program for use with the second platform.

15. The computer program product of claim 14, wherein the first instructions for converting at least one of filenames and a directory structure include instructions for shortening filenames in the first filename structure to shortened filenames in the second filename structure.

16. The computer program product of claim 14, wherein the first directory structure is a hierarchical directory structure and the second directory structure is a nonhierarchical directory structure.

17. The computer program product of claim 14, wherein the first platform is a Unix® platform and the second platform is an OS/400® platform.

18. The computer program product of claim 14, wherein the first instructions for converting at least one of filenames and a directory structure of the program are executed in a build environment.

19. The computer program product of claim 14, wherein the first instructions for converting at least one of filenames and a directory structure of the program are executed using a file editor.

20. The computer program product of claim 14, wherein the first instructions for converting at least one of filenames and a directory structure of the program include instructions for modifying header flies associated with files in the program to reflect the conversion of at least one of the filenames and the directory structure.

21. The computer program product of claim 14, wherein the first instructions far converting at least one of filenames and a directory structure include instructions for changing an original filename and directory structure to a modified filename and directory structure based on a mapping from the first platform to the second platform.

22. The computer program product of claim 21, further comprising:

instructions for determining if the modified filename and directory structure already exists; and instructions for further modifying the modified filename and directory structure if the modified filename and directory structure already exists.

23. The computer program product of claim 22, wherein the instructions for further modifying the modified filename and directory structure include:

instructions for notifying a user of a prior existence of the modified filename and directory structure; and instructions for receiving a selection of a new filename and directory structure from the user.

24. The computer program product of claim 22, wherein the instructions for modifying the modified filename and directory structure include:

instructions for replacing a character of the filename with a number or alternate character.

25. The computer program product of claim 14, further comprising third instructions for compiling the program natively.

26. The method of claim 14, further comprising third instructions for compiling the program using a cross-compiler.

27. An apparatus for porting a program from a first platform to a second platform, comprising:

means for converting at least one of filenames and a directory structure of the program from a first platform standard for the first platform to a second platform standard for the second platform, wherein the first platform standard includes a first filename structure and a first directory hierarchy structure, wherein the second platform standard includes a second filename structure and a second directory hierarchy structure, and wherein at least one of the second filename structure is more restricted in length than the first filename structure and the second directory hierarchy structure is more restricted in hierarchy than the first directory hierarchy structure; and means for storing the program for use with the second platform.

28. A method of porting a program from a first platform to a second platform, comprising:

converting filenames and a directory structure of the program from, a first platform standard for the first platform to a second platform standard for the second platform, wherein the first platform standard includes a hierarchical directory structure and the second platform standard includes a nonhierarchical directory structure; and storing the program for use with the second platform, wherein the method is performed in a build environment.

29. The method of claim 28, wherein the first platform standard further includes a first filename structure and the second platform standard further includes a second filename structure that is more restricted in length than the first filename structure.

30. The method according to claim 29, wherein converting filenames and a directory structure includes shortening filenames in the second filename structure.

31. The method of claim 28, wherein the first platform is a Unix® platform and the second platform is an OS/400® platform.

32. The method of claim 28, wherein converting filenames and a directory structure of the program is performed using a file editor.

33. The method of claim 28, wherein converting filenames and a directory structure of the program includes modifying header files associated with files in the program to reflect the conversion of at least one of the filenames and the directory structure.

34. The method of claim 28, wherein converting filenames and a directory structure includes changing an original filename and directory structure to a modified filename and directory structure based on a mapping from the first platform to the second platform.

35. The method of claim 34, further comprising:

determining if the modified filename and directory structure already exists; and further modifying the modified filename and directory structure if the modified filename and directory structure already exists.

36. The method of claim 35, wherein further modifying the modified filename and directory structure includes:

notifying a user of a prior existence of the modified filename and directory structure; and receiving a selection of a new filename and directory structure from the user.

37. The method of claim 36, wherein modifying the modified filename and directory structure includes:

replacing a character of the filename with a number or alternate character.

38. The method of claim 28, further comprising compiling the program natively.

39. The method of claim 28, further comprising compiling the program using a cross-compiler.

* * * * *